US008854387B2

(12) United States Patent
Chung

(10) Patent No.: US 8,854,387 B2
(45) Date of Patent: Oct. 7, 2014

(54) BUNDLE-BASED CPU/GPU MEMORY CONTROLLER COORDINATION MECHANISM

(75) Inventor: Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 959 days.

(21) Appl. No.: 12/975,806

(22) Filed: Dec. 22, 2010

(65) Prior Publication Data

US 2012/0162237 A1 Jun. 28, 2012

(51) Int. Cl.

*G09G 5/39* (2006.01)
*G06F 13/00* (2006.01)
*G09G 5/00* (2006.01)

(52) U.S. Cl.

CPC . *G09G 5/001* (2013.01); *G09G 5/39* (2013.01)
USPC .......................................... 345/532; 345/538

(58) Field of Classification Search

CPC ......... G09G 5/001; G09G 5/363; G09G 5/39; G09G 5/393; G09G 2360/121
USPC ................................................. 345/532, 538
See application file for complete search history.

(56) References Cited

U.S. PATENT DOCUMENTS

2005/0001847 A1* 1/2005 Jeddeloh ....................... 345/532
2009/0049256 A1* 2/2009 Hughes et al. ................ 711/158

OTHER PUBLICATIONS

O. Mutlu et al., Parallelism-Aware Batch Scheduling: Enhancing both Performance and Fairness of Shared DRAM Systems, ISCA 2008 Proceedings of the 35th Annual International Symposium on Computer Architecture, pp. 63-74.
John D. Owens et al., A Survey of General-Purpose Computation on Graphics Hardware, Eurographics 2005, State of the Art Reports, Aug. 2005, pp. 21-51.
I. Buck et al., GPUBench: Evaluating GPU performance for numerical and scientific applications, 2004 ACM Workshop on General-Purpose Computing on Graphics Processors, 2004.
I. Buck et al., Brook for GPUs: Stream computing on graphics hardware, ACM Transactions on Graphics, Proceeding, '04 ACM SIGGRAPH 2004 Papers, pp. 777-786.
S. Rixner et al., Memory access scheduling, ISCA-27, 2000.

* cited by examiner

*Primary Examiner* — Ryan R Yang
*Assistant Examiner* — Sae Won Yoon
(74) *Attorney, Agent, or Firm* — Volpe and Koenig, P.C.

(57) ABSTRACT

A system and method are disclosed for managing memory requests that are coordinated between a system memory controller and a graphics memory controller. Memory requests are pre-scheduled according to the optimization policies of the source memory controller and then sent over the CPU/GPU boundary in a bundle of pre-scheduled requests to the target memory controller. The target memory controller then processes pre-scheduling decisions contained in the pre-schedule requests, and in turn, issues memory requests as a proxy of the source memory controller. As a result, the target memory controller does not need to perform both CPU requests and GPU requests.

22 Claims, 6 Drawing Sheets

302 142 150

| Memory Controller Characteristics | System Memory Controller | Graphics Memory Controller |
|---|---|---|
| Primary Goal 308 | Lower Latency | Higher Bandwidth |
| Memory Type 310 | DDR | GDDR |
| Page Policy 312 | Open Page | Close Page |
| Data Transfer Unit 314 | 64 Bytes | 32 Bytes |
| Real-time Processing Support 316 | Not Required | Required |

BUNDLE-BASED CPU/GPU MEMORY CONTROLLER COORDINATION MECHANISM

BACKGROUND OF THE INVENTION

1. Field of the Invention

Embodiments of the invention relate generally to information processing systems. More specifically, embodiments of the invention provide an improved system and method for managing memory requests that are coordinated between a system memory controller and a graphics memory controller.

2. Description of the Related Art

The computing power of single instruction, multiple-data (SIMD) pipelines and the enhanced programmability of unified shaders supported by recent graphics processing units (GPUs) make them increasingly attractive for scalable, general purpose programming. Currently, there are numerous academic and industrial efforts for developing general purpose GPUs (GPGPUs), including the Advanced Micro Devices (AMD) Fusion®. Some GPGPU designs, including the Fusion®, incorporate x86 central processing units (CPUs) to provide advanced graphics engines with an efficient GPGPU hardware substrate.

While there are many possible approaches to integrating CPUs and GPUs, one solution is to have them communicate through each other's memory systems. For example, a CPU would have a communication path to the system memory managed by a CPU memory controller, and a GPU would have a communication path to the graphics memory managed by a GPU memory controller, just as if they were independent systems. To support communications between the CPU and GPU, the GPU would have an additional path to the system memory and the CPU would have an additional path to the graphics memory.

These additional paths support memory requests that cross the CPU/GPU boundary. In various implementations, the paths may be dedicated wires for low access latencies or conventional paths through an I/O bus (e.g., PCIe), where the system memory is accessed with direct memory access (DMA) by the GPU, and the graphics memory is accessed with memory-mapped I/O by the CPU. Ideally, individual memory requests sent through these additional paths are processed efficiently by the memory controllers. However, simply providing these additional memory paths generally fails to address typical performance and functionality issues caused by the differences between the CPU and GPU memory controllers.

SUMMARY OF EMBODIMENTS OF THE INVENTION

A system and method are disclosed for an improved system and method for managing memory requests that are coordinated between a system memory controller and a graphics memory controller. In various embodiments, memory controller coordination is implemented between a system memory controller and a graphics memory controller to manage memory requests that cross the central processing unit (CPU) and graphics processing unit (GPU) boundary. In these and other embodiments, memory requests are pre-scheduled according to the optimization policies of the source memory controller and then sent over the CPU/GPU boundary in a bundle of pre-scheduled requests to the target memory controller.

In certain embodiments the target memory controller then processes pre-scheduling decisions contained in the pre-scheduled requests, and in turn, issues memory requests as a proxy of the source memory controller which results in the target memory controller not needing to perform both CPU requests and GPU requests. As a result, the system memory controller is optimized only for requests from the CPU. Likewise, memory requests from the GPU are received in a bundle and the system memory controller blindly executes the requests in the order of the requests in the bundle produced by the graphics memory controller. Accordingly, the system memory controller does not need to know, or be optimized for, the characteristics of memory requests from the GPU. Likewise, the graphics memory controller does not need to know the characteristics of memory requests from the CPU.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for an improved system and method for managing memory requests that are coordinated between two memory controllers, such as, for example, a system memory controller and a graphics memory controller. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Also, some or all of the steps may represented as a set of instructions which are stored on a computer readable medium executable by a processing device.

Figure 1:
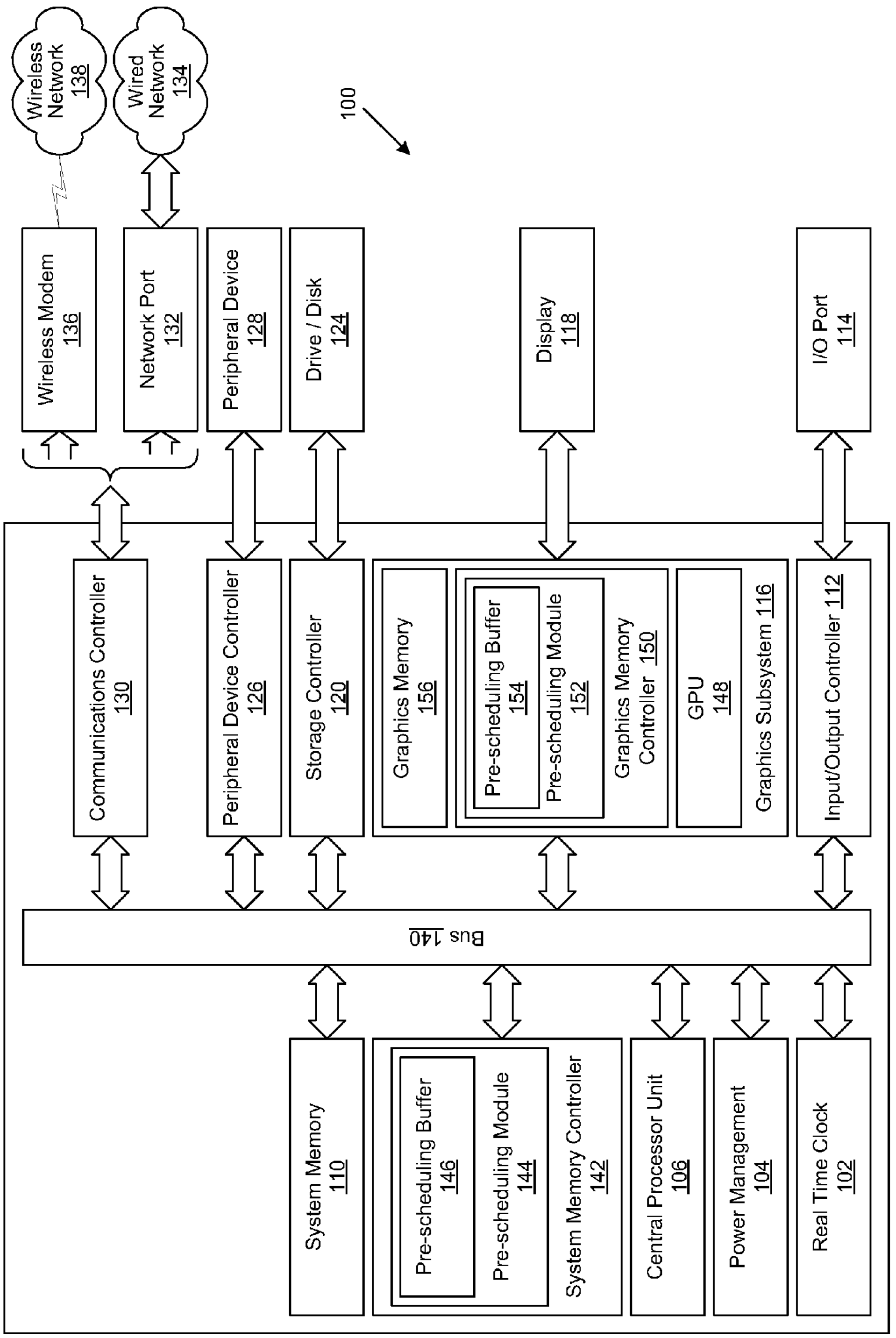
FIG. 1 is a generalized block diagram illustrating an information processing system as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a central processor unit (CPU) 106, a system memory controller 142, and system memory 110, all physically coupled via a communications interface such as bus 140. In various embodiments, the system memory controller 142 comprises a pre-scheduling module 144, which in turn comprises a pre-scheduling buffer 146. In these and other embodiments, memory 110 may comprise volatile random access memory (RAM), non-volatile read-only memory (ROM), non-volatile flash memory, or any combination thereof.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Graphics subsystem 116 is likewise physically coupled to bus 140 and further coupled to display 118. In various embodiments, the graphics subsystem 116 comprises a graphics processing unit (GPU) 148, a graphics memory controller 150, and graphics memory 150. In these and other embodiments, the graphics memory controller 150 comprises a pre-scheduling module 152, which in turn comprises a pre-scheduling buffer 154. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figures 2, 3:
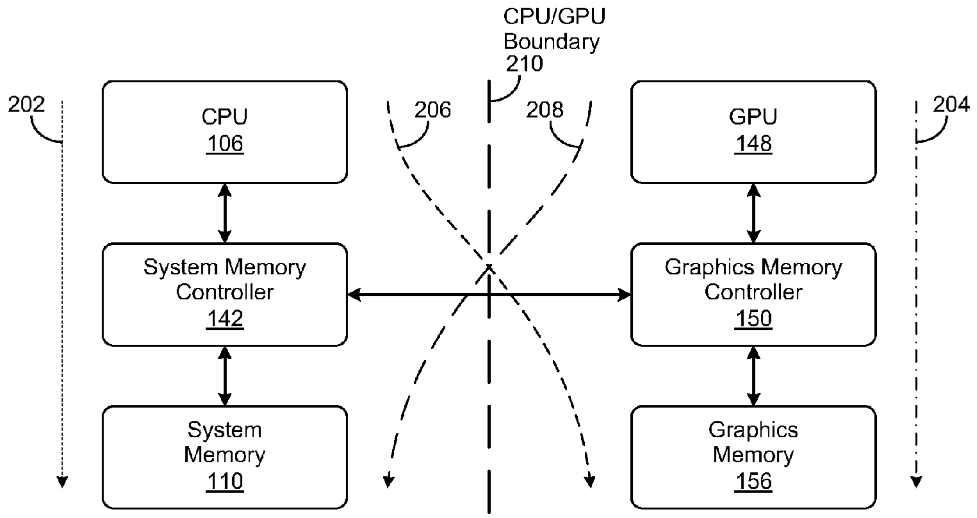
FIG. 2 is a simplified block diagram showing the implementation of a system memory controller and a graphics memory controller to manage memory requests that cross a central processing unit (CPU) and graphics processing unit (GPU) boundary.
FIG. 3 is a table showing the respective characteristics of a system memory controller and a graphics memory controller.

FIG. 2 is a simplified block diagram showing the implementation of two memory controllers—a system memory controller and a graphics memory controller—to manage memory requests that cross a boundary between two processors such as the illustrated central processing unit (CPU) and graphics processing unit (GPU) boundary. (As will be appreciated other types of processors—e.g., digital signal processors, field programmable gate arrays (FPGAs), baseband processors, microcontrollers, application processors and the like—in various combinations that result in multiple memory controllers could implement aspects of the present invention.) In various embodiments, CPU 106 has a communications path 202 to system memory 110, which is managed by a system memory controller 142, and GPU 148 has a communications path 204 to graphics memory 156, which is managed by a graphics memory controller 150. In these and other embodiments, the system memory controller 142 is coupled to the graphics memory controller 150 to provide a communications path 206 between CPU 106 and graphics memory 156 and a communications path 208 between GPU 148 and system memory 110.

In various embodiments, the additional communication paths 206, 208 that cross the CPU/GPU boundary 210 may be implemented using dedicated wires for low access latencies or conventional paths through an input/output (I/O) bus, such as a peripheral component interconnect express (PCIe) bus. In these and other embodiments, the system memory 110 may be accessed with direct memory access (DMA) by the GPU 148 and the graphics memory 156 is accessed with memory-mapped I/O by the CPU 106.

FIG. 3 is a table showing the respective characteristics of a system memory controller and a graphics memory controller as implemented in an embodiment of the invention. As shown in FIG. 3, memory controller characteristics for a system memory controller 142 and a graphics memory controller 150 typically comprise a primary goal 308, a memory type 310, a page policy 312, a data transfer unit 314, and real-time processing support 316. As likewise shown in FIG. 3, the primary goal 308 of a system memory controller 142 is lower latency, while the primary goal 308 of a graphics memory controller 150 is higher bandwidth. Likewise, the memory type 310 typically implemented in a system memory controller 142 is double data rate (DDR) while the memory type 310 typically implemented in a graphics memory controller 150 is graphics double data rate (GDDR). As likewise shown in FIG. 3, the page policy 312 of a system memory controller 142 is "Open Page" while the page policy of a graphics memory controller 150 is "Close Page." Likewise, the data transfer unit 314 of a system memory controller 142 is 64 Bytes while the data transfer unit 314 of a graphics memory controller is 32 Bytes. As likewise shown in FIG. 3, real-time processing support 316 is typically not required for a system memory controller 150 while it is typically required for a graphics memory controller 150.

As illustrated in FIG. 2, individual memory requests sent through communication paths 206, 208 are ideally processed efficiently by graphics memory controller 150 and system memory controller 142. However, skilled practitioners of the art will recognize that the provision of communication paths 206, 208 does not automatically address performance and functionality issues that result from the respective differences between the system memory controller 142 and the graphics memory controller 150 shown in FIG. 3.

For example, a GPU memory controller 150 is typically not optimized for individual memory requests. Instead, it is typically optimized to attain a primary goal 308 of providing high memory bandwidth, which supports SIMD pipelines by using high thread level parallelism (TLP) to leverage the latency-resilient characteristics of graphics applications. As a result, a CPU memory request that is sent to graphics memory may suffer from long access latency if it is scheduled according to a GPU memory controller 150 scheduling policy that buffers memory requests that take longer to find or builds a longer burst of memory requests going to the same DRAM page. As another example, a series of CPU memory requests with temporal and spatial locality could experience extra access latencies when sent over to the graphics memory due to the "Close Page" page policy 312 of the GPU memory controller 150. In this example, the page policy 312 actively closes a DRAM page, which is more efficient for GPU memory requests, and triggers extra DRAM page activation and pre-charging for the CPU memory requests if the requests are received sporadically over time.

As yet another example, a GPU request with real-time requirements may not be handled in a timely manner since a typical CPU scheduling policy is first-ready/first-come/first-serve (FRFCFS) where a memory request missing a DRAM row buffer will be under-prioritized. As a further example, memory requests typically will need to be reformatted if the system memory controller 142 and the graphics memory controller 150 use different data transfer units 314. In various embodiments, GPU memory requests for 32 Byte data transfer units 314 may be merged with another request to leverage 64 Byte data transfer units 314 by the system memory controller 142. In these and other embodiments, the 64 Byte return data transfer units 314 from the system memory controller 142 are split to serve the original 32 Byte memory requests from the GPU. Likewise, CPU requests for 64 Byte data transfer units 314 are split into two requests for the GPU memory requests. In view of the foregoing, those of skill in the art will appreciate that the differences between a CPU memory controller 142 and a GPU memory controller 150 creates challenges for efficient bi-directional communication between CPUs and GPUs through system memory.

Figure 4:
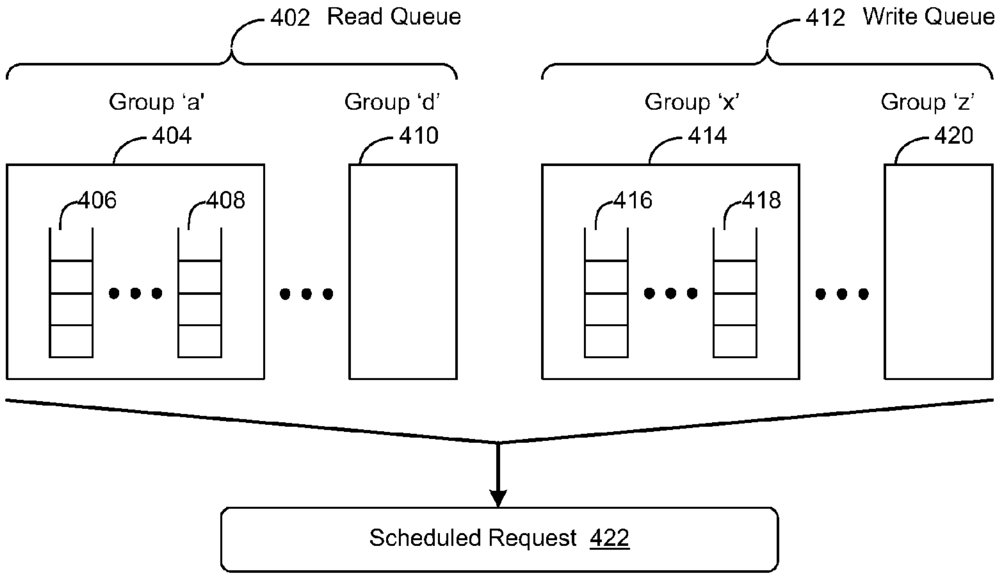
FIG. 4 is a simplified block diagram showing the shaping of memory requests by a graphics memory controller before they are sent to a system memory controller.

FIG. 4 is a simplified block diagram showing the shaping of memory requests by a graphics memory controller before they are sent to a system memory controller. In various embodiments, a GPU memory controller manages a scheduled memory request 422 in four groups, Group 'a' 404 through Group 'd' 410, for load requests in Read Queue 402, and another four groups, Group 'x' 414 through Group 'z' 420, for store requests in Write Queue 412. In these and other embodiments, the four groups Group 'a' 404 through Group 'd' 410 and Group 'x' 414 through Group 'z' 420 match four banks in system memory. Likewise, each group has four bins (e.g., 406, 408 and 416, 418) to collect memory requests that go to the same DRAM page of the same bank in system memory. In turn, each bin (e.g., 406, 408 and 416, 418) has a register to record the DRAM page address of the last memory request inserted into the bin. In various embodiments, a new incoming memory request from a GPU is checked against these addresses in the registers. If there is a matching bin, the request is inserted into the bin. If not, it is inserted into a bin in a round-robin sequence to increase the length of the memory request burst going to the same DRAM page.

In these and other embodiments, the requests in the bins 406 through 408 are arbitrated by selecting one out of the four groups, Group 'a' 404 through Group 'd' 410, for load requests in a round-robin sequencer. Likewise, another group, Group 'x' 414 through Group 'z' 420, is selected for store requests in the same way. Thereafter, within the selected group, a bin is likewise selected in a round-robin sequence and an arbitration operation is performed between the selected bin 406 through 408 for load requests and the selected bin 416 through 418 for store requests for the number of load and store requests executed up to that point. If more load requests are sent over to the CPU memory controller in a given time period, the bin 416 through 418 for store requests is selected. If not, the bin 404 through 408 for load requests is selected. Once the bin selection is done, all requests going to the same DRAM page are bursted from the bin to the CPU memory controller.

Skilled practitioners of the art will recognize that while this approach improves the DRAM row buffer hit ratio for system memory, it also has some limitations. For example, the memory requests 422 scheduled by the GPU memory controller are intermingled with the memory requests from the CPU. As a result the scheduling optimizations performed by the GPU memory controller superfluous since the CPU memory controller will reschedule memory requests to system memory. As another example, this approach does not address real-time requirements of memory requests from the GPU. As yet another example, bank-level parallelism in system memory is not supported as the CPU memory controller uses the open page policy and issues multiple memory requests to different banks so that they can be processed in parallel. As a result, potential performance improvement from bank-level parallelism by bursting only the memory requests going to the same bank is not realized. As a further example, CPU memory requests to graphics memory are not supported.

Figure 5:
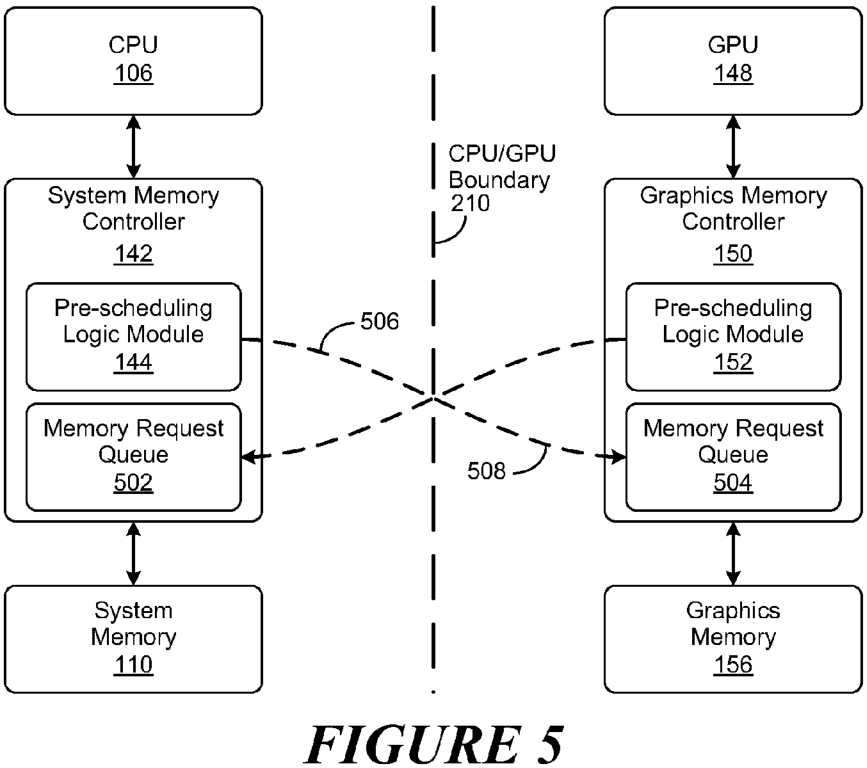
FIG. 5 is a simplified block diagram of a pre-scheduling logic module as implemented in system and graphics memory controllers for managing memory requests that cross the CPU/GPU boundary.

FIG. 5 is a simplified block diagram of a pre-scheduling logic module as implemented in system and graphics memory controllers for managing memory requests that cross the CPU/GPU boundary. In various embodiments, memory controller coordination is implemented between a system memory controller 142 and a graphics memory controller 150 to manage memory requests 506, 508 that cross the CPU/GPU boundary 210. In these and other embodiments, memory requests are pre-scheduled according to the optimization policies of the source memory controller 142, 150 and then sent over the CPU/GPU boundary in a bundle of pre-scheduled requests to the target memory controller 142, 150. Then, the target memory controller 142, 150 processes pre-scheduling decisions contained in the pre-schedule requests, and in turn, issues memory requests as a proxy of the source memory controller 142, 150, which results in the target memory controller 142, 150 not needing to perform both CPU requests and GPU requests.

As a result, the system memory controller 142 is optimized only for requests from the CPU 106. Likewise, memory requests from the GPU 148 are received in a bundle and the system memory controller 142 blindly executes the requests in the order of the requests in the bundle produced by the graphics memory controller 150. Accordingly, the system memory controller 142 does not need to know, or be optimized for, the characteristics of memory requests from the GPU 148. Likewise, the graphics memory controller 150 does not need to know the characteristics of memory requests from the CPU 106.

Referring now to FIG. 5, each memory controller 142, 150 respectively comprises a pre-scheduling logic module 144, 152. In various embodiments, bi-directional channels 506, 508 respectively couple the pre-scheduling logic modules 144, 152 of memory controllers 142, 150 to memory request queues 504 and 502. In these and other embodiments, accesses to the system memory 110 and the graphics memory 156 do not trigger cache coherence protocol for design simplicity. In other words, the memory coherence for memory requests crossing the CPU/GPU boundary 210 is maintained by flushing the CPU/GPU cache in software.

Figure 6:
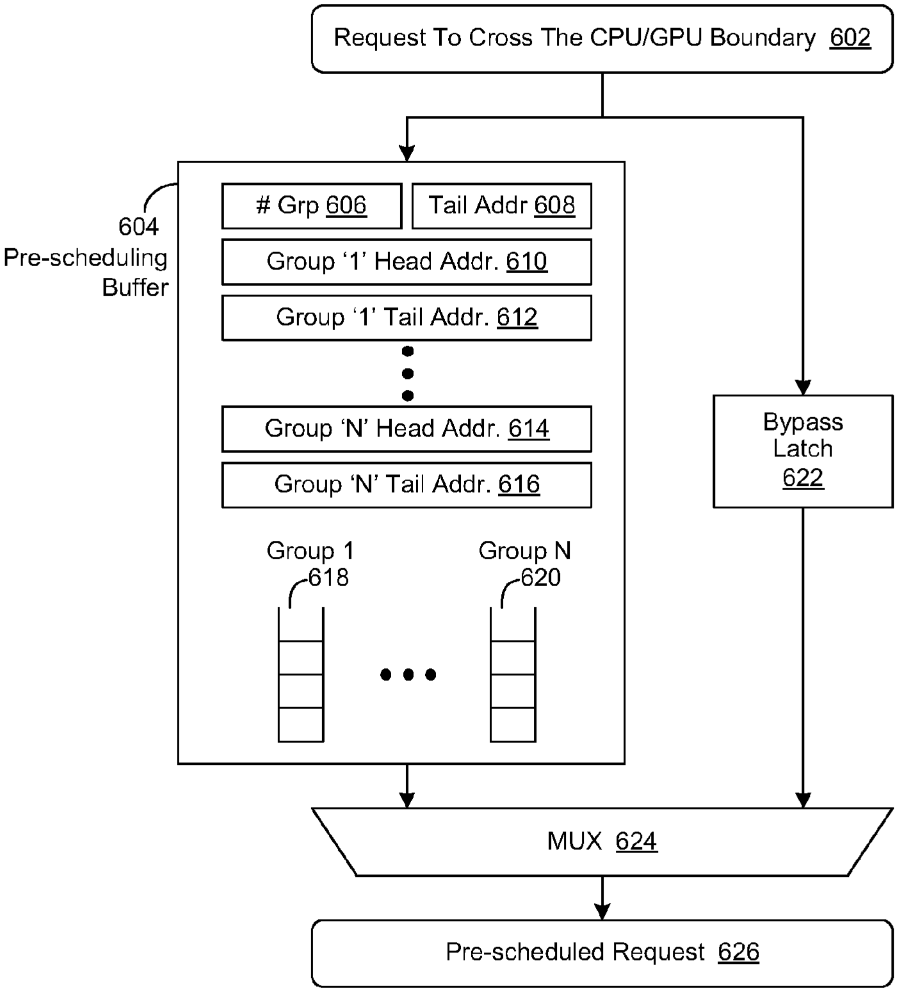
FIG. 6 is a simplified block diagram of a pre-scheduling buffer implemented to manage memory requests that cross the CPU/GPU boundary.

FIG. 6 is a simplified block diagram of a pre-scheduling buffer implemented to manage memory requests that cross the CPU/GPU boundary. In various embodiments, pre-scheduling logic in both the system and graphics memory controller comprises a pre-scheduling buffer 604 and a bypass latch 622. In these and other embodiments, the pre-scheduling buffer 604 comprises random access memory (RAM) partitioned logically for multiple groups '1' 618 through 'N' 620. The number of groups '1' 618 through 'N' 620 matches the number of banks in the target memory. For example, if the system memory has eight banks, the buffer in the graphics memory controller is partitioned into eight groups.

When a new memory request to cross the CPU/GPU boundary is received, its access address is examined to determine which bank in the target memory to route it to. The memory request is then inserted into the group corresponding to the target bank. Each group is managed as a linked list, and a new request is attached at the end of the list. A metadata block is allocated in the beginning of the RAM to record the number of groups 606, the tail address 608 of all buffered requests, and the head and tail addresses 610, 612, 614, 616 of each group.

In various embodiments, the aforementioned pre-scheduling logic module comprises a bypass latch 622. In these and other embodiments, a memory request comprising real-time constraints bypasses the pre-scheduling buffer 604. The bypassing request stays in the bypass latch 622 and leaves it at the next cycle. The MUX 624 at the output gives priority to the bypassing request unless a request bundle is not being built as explained hereinbelow. In various embodiments, when the number of buffered requests reaches a preconfigured threshold (e.g., 90% of the pre-scheduling buffer), a timeout period has expired since the last bundle was built, or the GPU issues instructions to flush the pre-scheduling buffer, and the memory requests in the pre-scheduling buffers 604 are sent over to the target memory controller. In one embodiment, the time-out for the system memory controller is typically set shorter than that of the graphics memory controller since the applications running on CPUs are typically more sensitive to memory latencies.

In these and various embodiments, buffered memory requests 626 are scheduled by the following rules in the order listed.

Group Rule: A group is selected in a round-robin sequence to schedule a memory request to improve bank-level parallelism.

Read-First Rule: A memory read request is prioritized over a memory write request to reduce read/write turnaround overhead. If there is a previous memory read request buffered, the following read request to the same address gets data from the write request to abide by the read-after-write (RAW) dependency.

Row-Hit Rule: Within the selected group, a memory request is selected that goes to the same memory page that the last scheduled request from the same group went to in order to increase the row-hit ratio.

First-Come/First-Serve rule: If there are multiple memory requests going to the memory page that the last scheduled request went to, the oldest memory request among them is selected. This rule is applied to two other cases. First, there is no request going to the memory page that the last scheduled request went to. Second, this is the first time a request from the group is scheduled (i.e., no last scheduled request). In these cases, an oldest request in the selected group is scheduled.

Those of skill in the art will recognized that while this default pre-scheduling policy is general enough to be efficient for both system and graphics memory, additional scheduling optimizations are possible to accommodate specific characteristics of either CPU or GPU applications.

In various embodiments, the data transfer granularities of the CPU and GPU do not match. For example, the system memory may transfers 64 Bytes per READ command and the graphics memory may transfer 32 Bytes per READ command. As a result, additional processing steps are typically required to address the discrepancy in the respective data transfer granularities. In these and other embodiments, assuming that the data transfer granularity is a power of 2, and if the data transfer granularity of the source memory system is bigger than that of the target memory system, an individual memory request is split into multiple memory requests to match the granularity. However, if the data transfer granularity of the source memory system is smaller, then nothing is done.

Once a request 626 is pre-scheduled as part of a request bundle, it is sent to the target memory controller. Individual memory requests of a request bundle are sent over time and are inserted into the memory request queue of the target memory controller. As explained in more detail herein, a memory request with real-time constraints bypasses the pre-scheduling buffer and is sent with the real-time (RT) bit tagged.

Figure 7:
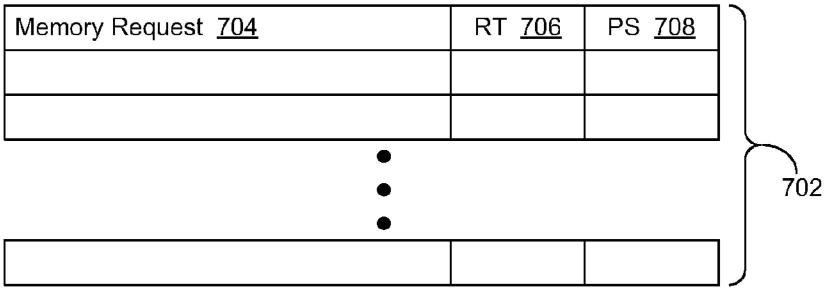
FIG. 7 is a simplified block diagram of a CPU memory request queue augmented with a real-time (RT) bit and a pre-scheduled (PS) bit.

FIG. 7 is a simplified block diagram of a CPU memory request queue augmented with a real-time (RT) bit and a pre-scheduled (PS) bit. In various embodiments, a baseline CPU memory request queue 702 is augmented with two bits per individual memory request 704 queue entry: a PS bit 706 and an RT bit 708. The PS bit 708 is set for a request that crossed the CPU/GPU boundary and is then reset when the request is processed. The RT bit 706 is set for a request with the RT bit tagged and reset when the request is processed.

In these and other embodiments, the system memory controller sets a timer for the oldest memory request with an RT bit 706. The memory request then obtains the highest priority when the timer expires (i.e., the request is about to violate its real-time constraints) and is scheduled as soon as possible. The system memory controller defers processing memory requests with the PS bit 708 until one of the requests with the PS bits 708 becomes the oldest request for two reasons. First, to have sufficient time for memory requests of the same request bundle to arrive at the system memory controller. Second, additional latency is acceptable for GPU memory requests since applications running on GPUs are typically designed to be latency-resilient.

Once the first memory request with the PS bit 708 (i.e., now the oldest request) is scheduled, individual memory requests 704 with the PS bit 708 in the memory request queue 702 are scheduled in the order they arrived at the memory request queue 702 until all individual memory requests 704 with the PS bit 708 in the memory request queue 702 are scheduled for two reasons. First, to take full advantage of the optimized pre-scheduling by avoiding mixing GPU memory requests with CPU memory requests. Second, to avoid further deferring memory requests that have already been buffered for a while.

Figure 8:
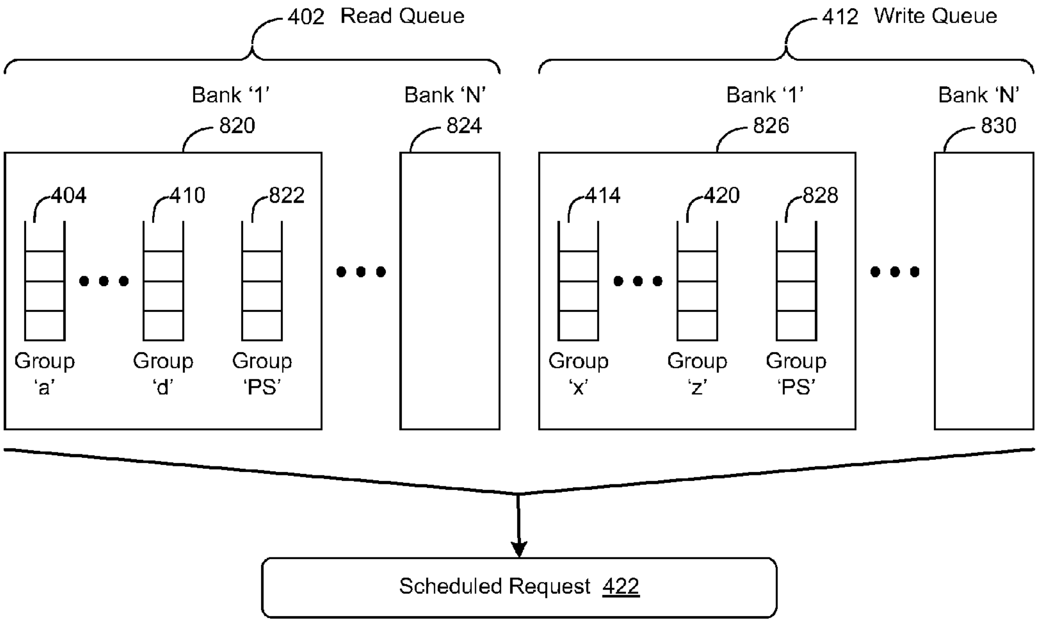
FIG. 8 is a simplified block diagram of a GPU memory request queue as implemented with group pre-scheduling.

FIG. 8 is a simplified block diagram of a GPU memory request queue as implemented with group pre-scheduling. In various embodiments, a baseline GPU memory request queue respectively uses multiple queues 404-410, 414-420, to serve memory requesters (i.e., GPU clients) with different priorities. In these and other embodiments, the GPU clients are categorized into multiple groups. Memory requests going to the same bank '1' 820 through 'N' 824 and '1' 826 through 'N' 830 are managed by multiple queues 404-410, 414-420 respectively associated with each group 'a'-'d' and 'x'-'z.' As shown in FIG. 8, there are two duplicate memory request queue structures, one for read requests 402 and the other for write requests 412.

In various environments, memory requests are scheduled according to the priority of the queue that the requests are buffered. In these and other embodiments, the queue priority is calculated based on the number of outstanding memory requests, the age of the pending memory requests, memory request urgency (i.e., the priority of a memory request set by the requester), the requester's execution status (i.e., is the requester stalled due to pending memory requests), and time-out. The highest priority queue is first selected among the queues associated with the same bank (e.g., bank '1' 820). Then, the highest priority queue is selected from among all of the banks (e.g., bank '1' 820 through 'N' 824). Finally, the highest priority queue is selected between the read request queue 402 and the write request queue 412. Once the highest priority queue is selected, the individual memory requests associated with the selected queue are bursted until one of the following conditions is met:

A DRAM page conflict happens

The memory requests are left in the queue

The number of bursted requests has reached a MAX_BURST threshold

In various embodiments, a pre-scheduled (PS) group 822, 828 is added to handle memory request bundles from the CPU. In these and other embodiments, individual memory requests associated with memory request bundles from the CPU are associated with the PS group 822, 828. First, a timer is set for the oldest memory request with the RT bit. The memory request is then given the highest priority when the timer expires (i.e., the request is about to violate its real-time constraints). In turn, the rest of the memory requests from the CPU are given a high priority, which is set by the operating system (OS). By default, the highest priority is set for the whole group to reduce memory access latencies for CPU memory requests. Then, the GPU arbitration scheme described in greater detail hereinabove handles the CPU memory requests.

In various embodiments, additional processing may be required if the data transfer granularity of the system memory and the graphics memory does not match. For example, if the data transfer granularity of the source memory system is smaller than that of the target memory system, then the returned data will contain more data than was requested by the memory request. In one embodiment, the surplus portion of the returned data is removed by using the address of the original memory request as a mask offset. In another embodiment, if the data transfer granularity of the source memory system is larger, then a single return data merge register (RDMR) is used to gather the returned data from the multiple memory requests by splitting the original memory request during the pre-scheduling process. In this embodiment, a single RDMR is sufficient for merging the returned data as the target memory controller handles the split requests in the order that they arrive, and likewise, returns data in the same order.

Those of skill in the art will appreciate that the present invention may provide several advantages in certain embodiments. First, the target memory controller may handle memory requests in a pre-scheduled order without mixing them with other memory requests due to the pre-scheduling optimization done by the source memory controller. Second, memory requests with real-time constraints are may be processed in a timely manner. Third, memory requests may be pre-scheduled not only for high row bit ratio, but also for high bank-level parallelism. Fourth, CPU memory requests going to the graphics memory may be accommodated. As will be appreciated by those of ordinary skill, not all advantages may be present to the same degree, or at all, in all embodiments of the invention.

Figure 9:
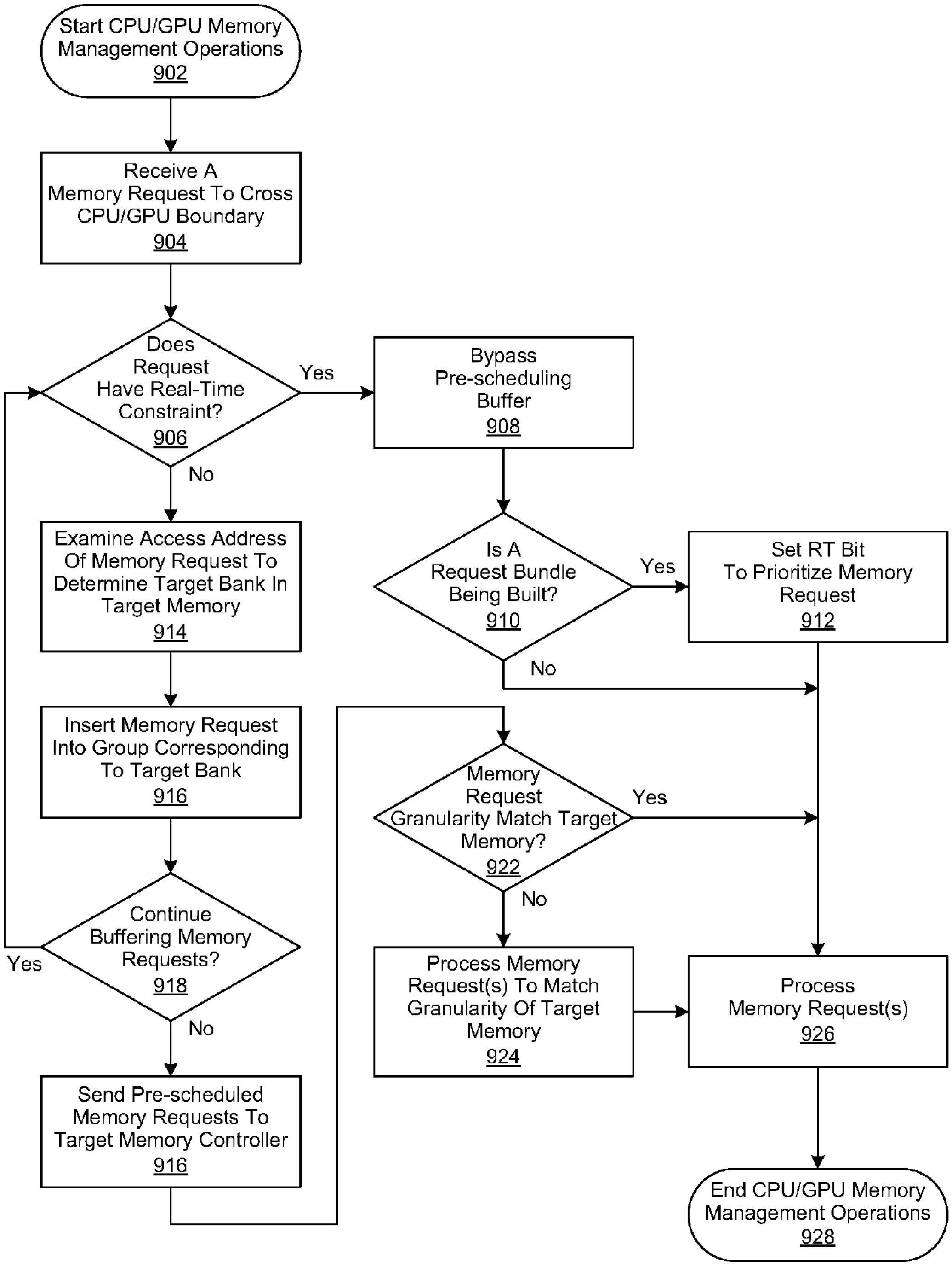
FIG. 9 is a generalized flow chart of the operation of a pre-scheduling buffer implemented to manage memory requests that cross the CPU/GPU boundary.

FIG. 9 is a generalized flow chart of the operation of a pre-scheduling buffer implemented in an embodiment of the invention to manage memory requests that cross the CPU/GPU boundary. In this embodiment CPU/GPU memory management operations are begun in step 902, followed by either a system or graphics memory controller receiving a memory request to cross the CPU/GPU boundary in step 904. In various embodiments, both the system and graphics memory controllers comprise pre-scheduling logic that further comprises a pre-scheduling buffer and a bypass latch. In these and other embodiments, the pre-scheduling buffer likewise comprises random access memory (RAM) partitioned logically for multiple groups, which matches the number of banks in the target memory. For example, if the system memory has eight banks, the buffer in the graphics memory controller is partitioned into eight groups.

A determination is made in step 906 whether the received memory request has a real-time (RT) constraint. If so, then the pre-scheduling buffer is bypassed in step 908, followed by a determination being made in step 910 whether a memory request bundle is being built. If so, then an RT bit is set in step 912 to prioritize the memory request, as described in greater detail herein. Otherwise, or if it was determined in step 906 that the memory request does not have a real-time constraint, the access address of the memory request is examined in step 914 to determine which bank in the target memory to route it to. The memory request is then inserted into the group corresponding to the target bank in step 916. In various embodiments, each group is managed as a linked list, and a new request is attached at the end of the list. A metadata block is allocated in the beginning of the RAM to record the number of groups, the tail address of all buffered requests, and the head and tail addresses each group.

A determination is made in step 918 whether to continue buffering memory requests. In various embodiments, memory request buffering is discontinued if the number of buffered memory requests has reached a preconfigured threshold (e.g., 90% of the pre-scheduling buffer), a timeout period has expired since the last bundle was built, or the GPU issues instructions to flush the pre-scheduling buffer. If it is determined in step 918 to continue buffering memory requests, then the process is continued, proceeding with step 906. Otherwise, the memory requests in the pre-scheduling buffers are sent over to the target memory controller in step 916.

A determination is then made in step 922 whether the granularity of each memory request matches the target memory. If not, then each memory request is processed, as described in greater detail herein, to match the granularity of the target memory. Thereafter, or if it was determined in step 910 that a request bundle is not being built or if it was determined in step 922 that the granularity of the memory requests match the target memory, or in step 912 that the memory request was prioritized by setting an RT bit, the memory request(s) are then processed in step 926 and CPU/GPU memory management operations are ended in step 928.

It will be appreciated that known methodologies (e.g., a hardware description language (HDL), a Verilog type HDL or the like) may be used to transform source code into other representations (e.g., a database file format such as graphic database system II (GDSII) type data) that can be used to configure a manufacturing facilitate to produce an integrated circuit such as a processor. It will further be appreciated that a computer readable medium may include the source code or other representations that can be used to configure a manufacturing facility.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for managing memory requests comprising:

a first memory controller comprising a first set of processing logic operable to process a first plurality of memory requests according to a first set of rules to generate a first set of pre-scheduled memory requests; and a second memory controller comprising a second set of processing logic operable to process a second plurality of memory requests according to a second set of rules to generate a second set of pre-scheduled memory requests, wherein:

the first set of pre-scheduled memory requests are provided to the second memory controller by the first memory controller and the second set of pre-scheduled memory requests are provided to the first memory controller by the second memory controller; and the first set of pre-scheduled memory requests are processed by the second set of processing logic to perform second memory operations and the second set of pre-scheduled memory requests are processed by the first set of processing logic to perform first memory operations.

2. The system of claim 1, wherein the first memory controller comprises a system memory controller and the second memory controller comprises a graphics memory controller.

3. The system of claim 1, wherein the first plurality of memory requests is provided by a central processing unit and the second plurality of memory requests is provided by a graphics processing unit.

4. The system of claim 1, wherein the first and second sets of processing logic comprise:

a pre-scheduling buffer operable to respectively store the first and second sets of pre-scheduled memory requests, wherein individual pre-scheduled memory requests comprise a pre-scheduled bit;

a bypass latch operable to respectively process individual memory requests of the first and second memory requests that comprise real-time constraints to generate a prioritized memory request, wherein the individual memory requests comprise a real-time bit; and a multiplexer operable to process the real-time and pre-schedule bits to prioritize the processing of a prioritized memory request ahead of the first and second sets of pre-scheduled memory requests.

5. The system of claim 4, wherein the pre-scheduling buffer comprises random access memory logically partitioned into a plurality of groups, wherein individual groups of the plurality of groups are associated with a corresponding bank of a target memory.

6. The system of claim 5, wherein the first and second sets of rules comprise:

a group rule, wherein a group is selected in a round-robin sequence to schedule a memory request to improve bank-level parallelism;

a read-first rule, wherein a memory read request is prioritized over a memory write request to reduce read/write turnaround overhead and a following memory read request to a same address acquires data from the memory write request to abide by the read-after-write (RAW) dependency if a previous memory read request is buffered;

a row-hit rule, wherein within a selected group of the plurality of groups, a memory request is selected that is sent to a same memory page that a last scheduled request from the same group was sent to; and a first-come/first-serve rule, wherein an oldest memory request is selected from a plurality of memory requests going to the same memory page as the last scheduled memory request.

7. The system of claim 6, wherein the first-come/first-serve rule is applied when either:

there is no memory request going to the same memory page as the last scheduled memory request; and a memory request from a selected group is scheduled for the first time, wherein the oldest memory request in the selected group is scheduled.

8. The system of claim 5, wherein the second set of processing logic is further operable to perform prioritization operations on a plurality of first sets of pre-scheduled memory requests to generate a set of prioritized first sets of pre-scheduled memory requests.

9. The system of claim 8, wherein the prioritized first sets of pre-scheduled memory requests are associated with a pre-scheduled group.

10. The system of claim 9, wherein the second set of processing logic is further operable to prioritize the processing of the pre-scheduled group by applying a real-time bit to an oldest individual pre-scheduled memory request associated with the pre-scheduled group.

11. The system of claim 1, wherein:

a data transfer granularity of the system memory is larger than a data transfer granularity of the graphics memory; and the first set of processing logic is further operable to split individual memory requests of the first plurality of memory requests into a plurality of smaller memory requests having a same data transfer granularity of the graphics memory.

12. A computer-implemented method for managing memory requests comprising:

using a first memory controller comprising a first set of processing logic to process a first plurality of memory requests according to a first set of rules to generate a first set of pre-scheduled memory requests; and using a second memory controller comprising a second set of processing logic to process a second plurality of memory requests according to a second set of rules to generate a second set of pre-scheduled memory requests, wherein:

the first set of pre-scheduled memory requests are provided to the second memory controller by the first memory controller and the second set of pre-scheduled memory requests are provided to the first memory controller by the second memory controller; and the first set of pre-scheduled memory requests are processed by the second set of processing logic to perform second memory operations and the second set of pre-scheduled memory requests are processed by the first set of processing logic to perform first memory operations.

13. The computer-implemented method of claim 12, wherein the first memory controller comprises a system memory controller and the second memory controller comprises a graphics memory controller.

14. The computer-implemented method of claim 12, wherein the first plurality of memory requests is provided by a central processing unit and the second plurality of memory requests is provided by a graphics processing unit.

15. The computer-implemented method of claim 12, wherein the first and second sets of processing logic comprise:

a pre-scheduling buffer operable to respectively store the first and second sets of pre-scheduled memory requests, wherein individual pre-scheduled memory requests comprise a pre-scheduled bit;

a bypass latch operable to respectively process individual memory requests of the first and second memory requests that comprise real-time constraints to generate a prioritized memory request, wherein the individual memory requests comprise a real-time bit; and a multiplexer operable to process the real-time and pre-schedule bits to prioritize the processing of a prioritized memory request ahead of the first and second sets of pre-scheduled memory requests.

16. The computer-implemented method of claim 15, wherein the pre-scheduling buffer comprises random access memory logically partitioned into a plurality of groups, wherein individual groups of the plurality of groups are associated with a corresponding bank of a target memory.

17. The computer-implemented method of claim 16, wherein the first and second sets of rules comprise:

a group rule, wherein a group is selected in a round-robin sequence to schedule a memory request to improve bank-level parallelism;

a read-first rule, wherein a memory read request is prioritized over a memory write request to reduce read/write turnaround overhead and a following memory read request to a same address acquires data from the memory write request to abide by the read-after-write (RAW) dependency if a previous memory read request is buffered;

a row-hit rule, wherein within a selected group of the plurality of groups, a memory request is selected that is sent to a same memory page that a last scheduled request from the same group was sent to; and a first-come/first-serve rule, wherein an oldest memory request is selected from a plurality of memory requests going to the same memory page as the last scheduled memory request.

18. The computer-implemented method of claim 17, wherein the first-come/first-serve rule is applied when either:

there is no memory request going to the same memory page as the last scheduled memory request; and a memory request from a selected group is scheduled for the first time, wherein the oldest memory request in the selected group is scheduled.

19. The computer-implemented method of claim 16, wherein the second set of processing logic is further operable to perform prioritization operations on a plurality of first sets of pre-scheduled memory requests to generate a set of prioritized first sets of pre-scheduled memory requests.

20. The computer-implemented method of claim 19, wherein the prioritized first sets of pre-scheduled memory requests are associated with a pre-scheduled group.

21. The computer-implemented method of claim 20, wherein the second set of processing logic is further operable to prioritize the processing of the pre-scheduled group by applying a real-time bit to an oldest individual pre-scheduled memory request associated with the pre-scheduled group.

22. The computer-implemented method of claim 12, wherein:

a data transfer granularity of the system memory is larger than a data transfer granularity of the graphics memory; and the first set of processing logic is further operable to split individual memory requests of the first plurality of memory requests into a plurality of smaller memory requests having a same data transfer granularity of the graphics memory.

* * * * *